United States Patent
Perry

(10) Patent No.: US 8,455,146 B2
(45) Date of Patent: Jun. 4, 2013

(54) RAPID START-UP AND OPERATING SYSTEM FOR A FUEL CELL POWER PLANT UTILIZING A REFORMATE

(75) Inventor: Michael L. Perry, Glastonbury, CT (US)

(73) Assignee: UTC Power Corporation, South Windsor, CT (US)

( * ) Notice: Subject to any disclaimer, the term of this patent is extended or adjusted under 35 U.S.C. 154(b) by 50 days.

(21) Appl. No.: 12/734,862

(22) PCT Filed: Dec. 20, 2007

(86) PCT No.: PCT/US2007/026096
§ 371 (c)(1),
(2), (4) Date: May 27, 2010

(87) PCT Pub. No.: WO2009/082368
PCT Pub. Date: Jul. 2, 2009

(65) Prior Publication Data
US 2010/0304239 A1  Dec. 2, 2010

(51) Int. Cl.
*H01M 8/04* (2006.01)
*H01M 8/06* (2006.01)

(52) U.S. Cl.
USPC ............................ 429/422; 429/429; 429/443

(58) Field of Classification Search
USPC .................................................. 429/400–535
See application file for complete search history.

(56) References Cited

U.S. PATENT DOCUMENTS

| | | | |
|---|---|---|---|
| 6,376,114 B1 * | 4/2002 | Bonville et al. | 429/425 |
| 6,984,464 B2 | 1/2006 | Margiott et al. | |
| 7,141,323 B2 | 11/2006 | Ballantine et al. | |
| 7,141,324 B2 | 11/2006 | Margiott et al. | |
| 2004/0001980 A1 * | 1/2004 | Balliet et al. | 429/13 |
| 2004/0028979 A1 * | 2/2004 | Ballantine et al. | 429/34 |
| 2005/0181247 A1 * | 8/2005 | Foger et al. | 429/17 |
| 2005/0217178 A1 * | 10/2005 | Aoyama | 48/127.9 |
| 2006/0078780 A1 * | 4/2006 | Margiott et al. | 429/34 |
| 2009/0136790 A1 * | 5/2009 | Schrieber et al. | 429/13 |

* cited by examiner

*Primary Examiner* — Basia Ridley
*Assistant Examiner* — James Lee
(74) *Attorney, Agent, or Firm* — Malcolm J. Chisholm, Jr.

(57) ABSTRACT

A fuel cell power plant (10) includes a power supply (58) that directs a direct current to catalysts (24), (26) of a fuel cell (22) after terminating flow of electricity to a primary load (52), and after flow of an oxidant adjacent the cathode catalyst (26) is terminated, and while a reformate fuel is directed adjacent the anode catalyst (24). Pure hydrogen fuel generated thereby at the cathode catalyst (26) is directed into a hydrogen storage tank (62). Upon start-up of the power plant (10), the stored hydrogen gas is directed from the tank (62) to flow adjacent the anode catalyst (24) while a reformer (12) is being warmed up for operation, to provide virtually instantaneous start-up of the plant (10). Optionally, the stored hydrogen may be used occasionally during operation with the reformate fuel to meet an increased demand for electricity.

11 Claims, 1 Drawing Sheet

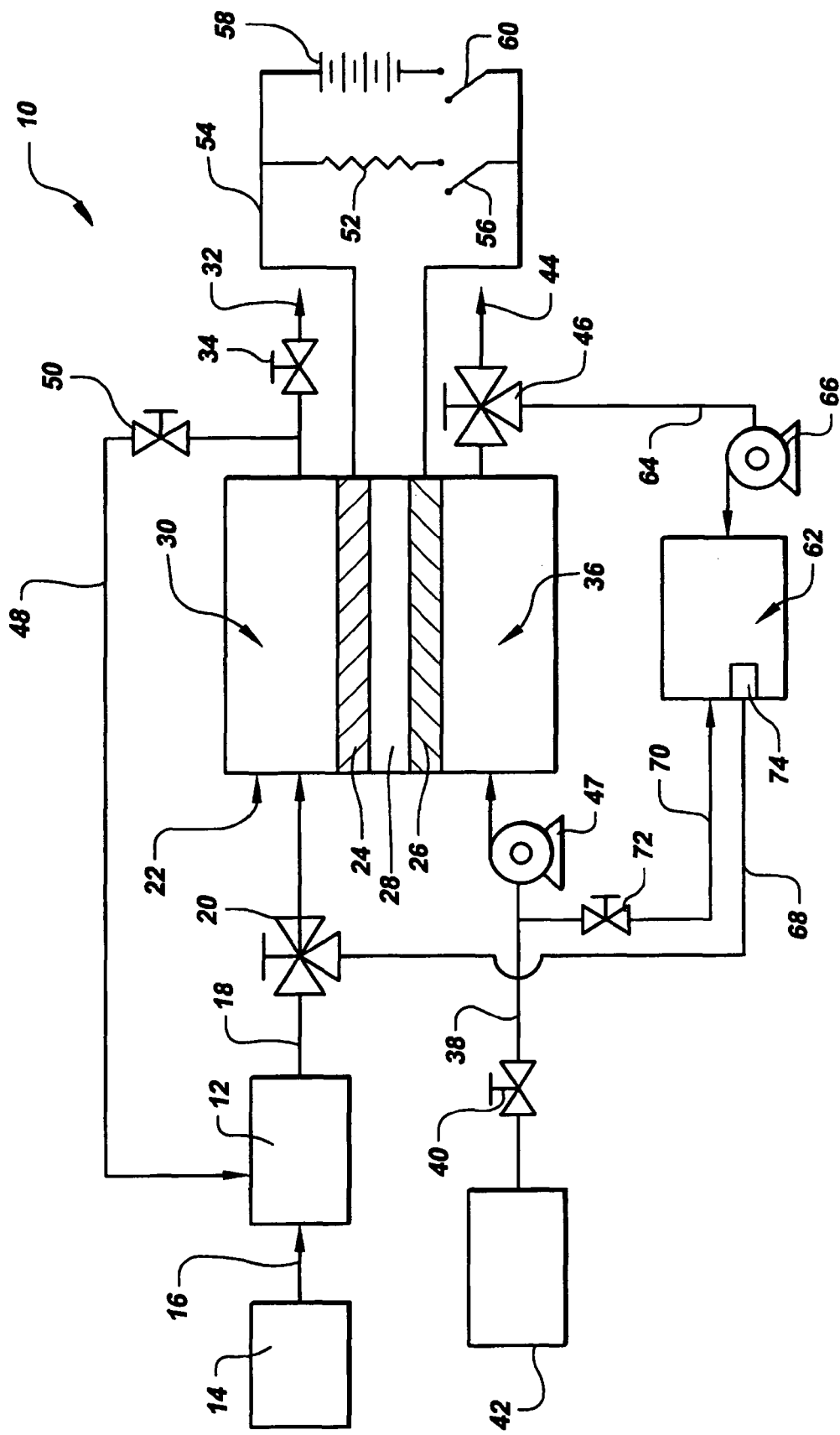

ns that may result, for example, due to a failure of an electrical power distribution grid.
RAPID START-UP AND OPERATING SYSTEM FOR A FUEL CELL POWER PLANT UTILIZING A REFORMATE

TECHNICAL FIELD

The present disclosure relates to fuel cell power plants that are suited for usage in transportation vehicles, portable power plants, or as stationary power plants, and the disclosure especially relates to a system and method for rapidly starting up a fuel cell power plant that utilizes reformate fuel produced by a reformer.

BACKGROUND ART

Fuel cells are well known and are commonly used to produce electrical current from hydrogen containing reducing fluid fuel and oxygen containing oxidant reactant streams to power electrical apparatus. Fuel cells are typically arranged in a cell stack assembly having a plurality of fuel cells arranged with common manifolds and other components such as a coolant loop, fuel reformer, controller and valves, etc. to form a fuel cell power plant. In such a fuel cell power plant of the prior art, it is well known that fuel is produced by the fuel reformer and the resulting hydrogen-rich fuel is referred to as a reformate fuel that flows from the reformer through a fuel inlet line into anode flow fields of the fuel cells. An oxygen-rich reactant simultaneously flows through cathode flow fields of the fuel cells to produce electricity.

Fuel cell power plants are known to provide electricity for differing types of apparatus. For example, many efforts are being undertaken to produce a fuel cell power plant utilizing "proton exchange membrane" (PEM) fuel cells to power transportation vehicles. Fuel cells utilizing phosphoric acid electrolytes are also known to power stationary electricity generating plants. A fuel cell power plant may also serve a valuable role as a back-up electricity generator for apparatus requiring electricity that are considered to be of extremely high value to society. For example, telecommunication stations provide very valuable services in maintaining consistent communication between government agencies, businesses, and individuals. At a time of emergency, such as a natural disaster, it is critically important that telecommunication stations remain functioning despite a loss of electrical power to the stations that may result, for example, due to a failure of an electrical power distribution grid.

Typical back-up power for critical systems have relied upon internal combustion engine powered generators and/or batteries that are costly to maintain, frequently operate for only short durations, and can be unreliable.

Fuel cell power plants have the potential to become efficient emergency back-up electricity generators. However, use of a fuel cell power plant as a back-up generator gives rise to many difficulties, such as a significant cost of storing large quantities of pure hydrogen. Fuel cells run optimally on fuel that is essentially pure hydrogen gas. Unfortunately, pure hydrogen gas must be compressed under very high pressure to store an adequate volume of the gas to operate a fuel cell power plant for more than several hours. Such high pressure storage of hydrogen gas involves substantial cost and safety concerns. Having a fuel reformer within the fuel cell power plant provides an opportunity to store and utilize readily available fuels such as natural gas or LPG, etc., that are easier to acquire, transport and store. However, a fuel reformer typically requires a long start-up time of about thirty minutes to generate adequate heat, steam and other prerequisites to reform a fuel into essentially hydrogen-rich gas.

Therefore, there is a need for a fuel cell power plant utilizing a reformate fuel that may rapidly start-up to serve as a reliable, efficient, emergency back-up electricity generator. There is also a need for a reformate-fuel powered fuel cell power plant that may quickly increase electricity output to meet sudden increases in demand for electricity by a critical load.

SUMMARY

The disclosure is directed to a rapid start-up and operating system for a fuel cell power plant utilizing a reformate fuel. The system includes a fuel cell power plant having a reformer for producing the hydrogen-rich reformate fuel, and at least one fuel cell for generating electrical current from the reformate fuel and an oxygen-containing oxidant. The fuel cell includes an anode catalyst and a cathode catalyst secured to opposed sides of an electrolyte. An anode flow field is defined in fluid communication with both the anode catalyst and also through a fuel-inlet line with the reformer. The anode flow field directs flow of the reformate fuel from the fuel-inlet line adjacent the anode catalyst. A cathode flow field is also defined in fluid communication with both the cathode catalyst and also through an oxidant-inlet line with an oxidant source for directing flow of the oxidant adjacent the cathode catalyst to produce electricity. A primary load such as telecommunications station is secured in electrical communication through an external circuit with the anode catalyst and cathode catalyst, and the external circuit includes a primary load switch. An electrical power supply is also secured in electrical communication with the external circuit for selectively supplying direct current through a power switch to the anode and cathode catalysts. A hydrogen storage tank is secured in fluid communication between the cathode flow field and the fuel inlet line between the reformer and the anode flow field.

When the primary load switch is open to stop electricity from flowing into the primary load, the power switch is closed to permit a direct current to flow from the electrical power supply such as a direct current battery, or a converter secured to an alternating current source, to the fuel cell catalysts. Simultaneously the reformate fuel is being supplied to the anode flow field and in this mode of operation, the fuel cell effectively generates pure hydrogen gas at the cathode catalyst which collects within the cathode flow field. The hydrogen gas at the cathode flow field is then compressed for storage within the hydrogen storage tank. The tank is configured to store an adequate amount of hydrogen to supply the fuel cell while the reformer warms up during a next start-up of the fuel cell power plant. Consequently, the system provides for a virtually instantaneous start-up of the fuel cell. The hydrogen storage tank may also be configured to hold an additional amount of hydrogen to meet a sudden spike in power demand. It is well known that a reformer cannot be efficiently operated to meet varying hydrogen demands. Instead, the hydrogen stored in the tank may be selectively admitted to the fuel cell to meet an increased demand for electricity by the primary load.

A compressor is secured in fluid communication between the cathode flow field and the hydrogen storage tank for selectively compressing flow of hydrogen generated at the cathode catalyst into the hydrogen storage tank. In a first embodiment, the compressor may be a hydrogen compressor secured in fluid communication between a cathode exhaust line and the hydrogen storage tank. In an alternative embodiment, the power plant may include an oxidant blower secured in fluid communication between an oxidant source such as the atmosphere or compressed oxidant container and a cathode inlet line. In this embodiment the oxidant blower may also be operated as a compressor to direct flow of hydrogen generated at the cathode catalyst into the hydrogen storage tank. This embodiment requires a cathode inlet valve being secured upstream of the oxidant blower to prevent hydrogen flowing from the blower into the oxidant source.

The present disclosure also includes a method of operating a reformate fuel powered fuel cell power plant to produce a rapid start-up of the power plant and to generate stored pure hydrogen fuel to support fluctuating energy demands on the plant. The method includes steps of first supplying an oxidant adjacent a cathode catalyst and supplying the reformate fuel adjacent an anode catalyst of at least one fuel cell of the plant to produce electricity. The electricity is directed through an external circuit to power a primary load. A primary load switch would eventually be opened to terminate flow of electricity to the primary load. In a back-up power application, this is typically done when the primary source, e.g., an electrical grid, returns to service. Then, using this power source, a flow of direct current electricity is directed from the power supply to the anode and cathode catalysts of the fuel cell while the flow of the reformate fuel adjacent the anode catalyst is maintained, and flow of the oxidant adjacent the cathode catalyst is terminated.

This results in generation of hydrogen at the cathode catalyst which is compressed into a storage tank. When the storage tank is filled with the desired quantity of hydrogen, then flow of the direct current electricity to the catalysts is terminated as is flow of the reformate fuel adjacent the anode catalyst of the fuel cell. Next, to start up the fuel cell power plant flow of the oxidant is directed adjacent the cathode catalyst while flow of the stored hydrogen gas from the hydrogen storage tank is directed adjacent the anode catalyst. The primary load switch is closed to direct electricity from the fuel cell to the primary load. The method also includes selectively directing flow of the stored hydrogen gas while the reformate fuel is simultaneously flowing adjacent the anode catalyst to provide additional fuel to the fuel cell for increases in demand for electricity by the primary load.

Accordingly, it is a general purpose of the present disclosure to provide a rapid start-up and operating system for a fuel cell power plant utilizing a reformate fuel that overcomes deficiencies of the prior art.

It is a more specific purpose to provide a rapid start-up and operating system for a fuel cell power plant utilizing a reformate fuel that generates and stores hydrogen gas to facilitate spontaneous starting of the power plant and to meet variable load demands.

These and other purposes and advantages of the present rapid start-up and operating system for a fuel cell power plant utilizing a reformate fuel will become more readily apparent when the following description is read in conjunction with the accompanying drawings.

BRIEF DESCRIPTION OF DRAWING

FIG. 1 is a simplified schematic representation of a rapid start-up and operating system for a fuel cell power plant utilizing a reformate fuel of the present disclosure.

DESCRIPTION OF THE PREFERRED EMBODIMENTS

Referring to the drawings in detail, a rapid start-up and operating system for a fuel cell power plant utilizing a reformate fuel is shown in FIG. 1 and a fuel cell power plant appropriate for implementing the system is generally designated by the reference numeral 10. The system or power plant 10 includes a reformer 12 for reforming a hydrocarbon fuel such as natural gas, propane, diesel fuel, gasoline, etc., into a hydrogen-rich reformate fuel. The reformer 12 may be an auto-thermal reformer, a catalytic steam reformer, a partial oxidation reformer, or any reformer known in the art that can perform the described functions. The reformer 12 may receive the hydrocarbon fuel from a fuel source 14 through a fuel line 16. The reformate fuel is directed from the reformer 12 through a fuel inlet line 18 and a fuel inlet valve 20 into a fuel cell 22.

The fuel cell 22 includes an anode catalyst 24 and a cathode catalyst 26 secured to opposed sides of an electrolyte 28. The electrolyte 28 may be a proton exchange membrane (PEM) electrolyte, or any electrolyte known in the art. An anode flow field 30 is defined in fluid communication with both the anode catalyst 24 and also through the fuel inlet line 18 with the reformer 12. The anode flow field 30 directs flow of the reformate fuel from the fuel inlet line 18 adjacent the anode catalyst 24 and out of the anode flow field 30 through an anode exhaust line 32 and an anode exhaust valve 34.

A cathode flow field 36 is also defined in fluid communication with both the cathode catalyst 26 and also through an oxidant inlet line 38 including an oxidant inlet valve 40 with an oxidant source 42 for directing flow of an oxidant from the oxidant inlet line 38 adjacent the cathode catalyst 26 to produce electricity. A cathode exhaust line 44 including a cathode exhaust valve 46 is secured in fluid communication with the cathode flow field 36 to direct the oxidant out of the fuel cell 22. An oxidant blower 47 may be secured to the oxidant inlet line 38 to control flow of the oxidant into the cathode flow field 36 at a desired pressure. In some embodiments of the system 10, the oxidant blower 47 may not be needed, for example if the oxidant source 42 is a pressurized container. The system 10 may also include a anode exhaust recycle line having an anode recycle valve 50 secured in fluid communication between the anode exhaust line 32 and the reformer 12 for selectively directing flow of partially used fuel to support the reformer 12. The anode exhaust recycle line 48 is secured to the anode exhaust line 32 between the anode exhaust valve 34 and the anode flow field 30.

A primary load 52 is secured in electrical communication through an external circuit 54 with the anode catalyst 24 and the cathode catalyst 26. The external circuit 54 includes a primary load switch 56, which is shown in an open position in FIG. 1 to prevent flow of electricity between the primary load 52 and the catalysts 24, 26. An electrical power supply 58 is also secured in electrical communication with the anode catalyst 24 and cathode catalyst 26, such as through the external circuit 54, for selectively supplying direct current through a power switch 60 to the anode and cathode catalysts 24, 26. In FIG. 1 the power switch 60 is also shown in an open position. (For purposes herein, the word "selectively" is to mean that a controller may control the primary load switch 56, power switch 60, or other described components, to be selected to be in either an open or closed position, or selected to store or distribute hydrogen gas, etc. at a desired time for a desired duration.)

A hydrogen storage tank 62 is secured in fluid communication between the cathode flow field 36 and the fuel inlet line 18 between the reformer 12 and the anode flow field 30. Hydrogen generated at the cathode catalyst 26 whenever the power supply 58 directs current to the anode and cathode catalysts 24, 26 may be directed to flow from the cathode flow field 36 through a hydrogen line 64 secured in fluid communication between the cathode flow field 36, such as at the cathode exhaust line 44 as shown in FIG. 1, and the hydrogen storage tank 62. The hydrogen line 64 may be secured to the cathode exhaust line 44 at the cathode exhaust valve 46, which may be a three-way valve known in the art having a capability to selectively direct flow of a fluid from the cathode flow field 36 through the cathode exhaust line 44, the hydrogen line, or a portion of the fluid through either line 44, 64, or to terminate flow through both line 44, 64. Alternatively, each line 44, 64 may include a two-way valve (not shown). A hydrogen compressor 66 may also be secured to the hydrogen line 64 to compress the hydrogen within the hydrogen storage tank 62 to a predetermined pressure. When hydrogen is being generated at the cathode catalyst 26 and then compressed into the hydrogen storage tank 62, the oxidant inlet valve 40 must be in a closed position to prevent movement of any hydrogen into the oxidant source 42, or out of the power plant 10 though the oxidant inlet line 38 if the oxidant is the atmosphere.

A hydrogen feed line 68 may be secured in fluid communication between the hydrogen storage tank 62 and the anode flow field 30, such as at the fuel inlet line 18 between the reformer 12 and the anode flow field 30. The hydrogen feed line 68 may be secured to the fuel inlet valve 20 which may be in the form of a three-way valve known in the art to selectively permit passage of only the reformate fuel from the reformer 12 through the fuel inlet line 18 into the anode flow field 30; or, to permit passage of only the hydrogen from the hydrogen feed line 68 into the fuel inlet line 18 down stream of the fuel inlet valve 20 and into the anode flow field 30; or, to permit simultaneous passage of selected portions of both the reformate and hydrogen fluids; or; to prevent passage of both the reformate fuel and hydrogen gas from the lines 18, 68, such as when the power plant 10 is shut down. Alternatively, the fuel inlet line 18 and hydrogen feed line 68 may have separate valves (not shown).

In an alternative embodiment, to minimize volume, weight and cost of the fuel cell power plant 10, the hydrogen compressor 66 may be omitted and instead the oxidant blower 47 may be a reversible blower or oxidant compressor 47 that may be utilized to compress the hydrogen from the cathode flow field 36 into the hydrogen storage tank 62. For that embodiment, a second hydrogen line 70 may be secured in fluid communication between the oxidant inlet line 38 and the hydrogen storage tank 62. The second hydrogen line 70, as shown in FIG. 1, is secured to the oxidant inlet line 38 between the oxidant inlet valve 40 and the cathode flow field 36 so that the oxidant inlet valve 40 may be closed to prevent hydrogen from passing from the second hydrogen line 70 up the oxidant inlet line into the oxidant source 42 or out of the power plant 10, as described above. The second hydrogen line 70 includes a hydrogen feed valve 72 to selectively permit or prevent passage of a hydrogen or the oxidant from the cathode flow field 36, oxidant blower 47 and oxidant inlet line 38 into the hydrogen storage tank 62. The oxidant inlet valve 40 and hydrogen feed valve 72 could be integrated in fluid communication with the oxidant inlet line 38 as a three-way valve (not shown) to minimize weight, volume, etc. of the power plant 10.

Whenever the hydrogen is being generated at the cathode catalyst 26, the oxidant inlet valve 40 is closed to prevent passage of fluid through the valve 40, the hydrogen feed valve 72 on the second hydrogen feed line 70 is opened to permit passage of fluid through the valve 72, the cathode exhaust valve 44 would be closed to prevent loss of hydrogen from the power plant 10, and the oxidant blower or oxidant compressor 47 is turned on to compress the hydrogen from the cathode flow field 36 into the hydrogen storage tank 62. In this embodiment there would be no hydrogen line 64 from the cathode flow field to the hydrogen storage tank 62, and no hydrogen compressor 66 to minimize weight and volume of the plant 10.

The hydrogen storage tank 62 may include an integral, controllable pressure regulator 74 to control flow of hydrogen gas from the tank 62 into the hydrogen feed line 68 and anode flow field 30 at a predetermined pressure and for a predetermined duration. Alternatively, the controllable pressure regulator 74 may be not integral with the tank and may be secured in fluid communication with the hydrogen passing from the tank 72 into the anode flow field 30.

The power plant 10 includes a controller means for controlling the valves 20, 34, 40, 46, 50, 72, compressors 47, 66, switches 56, 60, reformer 12, fuel supply 14, oxidant supply 42, pressure regulator 74, and other described components of the fuel cell power plant 10, to operate the plant 10 as described herein. The controller (not shown) may be any controller known in the art capable of performing the described functions, such as manual controls, electro-mechanically activated controls, computer activated controls, etc.

The disclosure includes a method of operating fuel cell power plant 10 to produce a rapid start-up of the power plant 10 and to generate stored pure hydrogen fuel to support fluctuating energy demands of the primary load 52. The method includes the steps of first supplying an oxidant adjacent the cathode catalyst and supplying the reformate fuel adjacent the anode catalyst 24 of the fuel cell 22 to produce electricity. The electricity is directed through the external circuit 54 to power the primary load 52. After the power plant is operated for the desired, or predetermined duration, the primary load switch 56 is opened to terminate flow of electricity to the primary load 52. Then a flow of direct current electricity is directed from the power supply 58 to the anode and cathode catalysts 24, 26 of the fuel cell 22 while the flow of the reformate fuel adjacent the anode catalyst 24 is maintained and flow of the oxidant adjacent the cathode catalyst 26 is terminated.

Hydrogen is thereby generated at the cathode catalyst 26 which is compressed into the storage tank 62. Alternatively, the hydrogen may simply be directed to flow into the storage tank 62 without need for a separate compressor in circumstances wherein the fuel cell 22 generates hydrogen at a sufficient pressure to support storage of the hydrogen within the storage tank 62. Flow of the direct current electricity to the catalysts 24, 26 is terminated after a predetermined duration, or after the storage tank 62 is filled to a predetermined level, as is flow of the reformate fuel adjacent the anode catalyst 24, which shuts down the power plant 10. Next, to start up the plant 10, flow of the oxidant is directed adjacent the cathode catalyst 26 while flow of the stored hydrogen gas from the hydrogen storage tank 62 is directed adjacent the anode catalyst 24. The primary load switch 56 is closed to direct electricity from the fuel cell 22 to the primary load 52. The method also includes selectively directing flow of the stored hydrogen gas while the reformate fuel is simultaneously flowing adjacent the anode catalyst 24 to provide additional fuel to the fuel cell 22 for increases in demand for electricity by the primary load 52.

As is apparent, the present rapid start-up and operating system provides many advantages over known systems. By providing for virtually instantaneous start-up of the fuel cell power plant 10 deployed as a back-up power supply, the system eliminates any need for costly storage of large amounts of pure hydrogen gas, and instead provides for utilization of readily available and easily stored fuels. Additionally, by using a small amount of stored hydrogen gas to run the fuel cell 22 while the reformer 12 is starting up, the present system eliminates any need for storing energy such as in large batteries to supply electricity while a reformer is starting up. Also, the present disclosure utilizes existing hardware, such as the fuel cell 22 of the plant for generating the stored hydrogen and does not require a separate hydrogen generator, such as known, complex membrane-based hydrogen generators. Further, the present system may be operated, to store more hydrogen gas in the storage tank 62 than is necessary for start-up of the system, so that the additional stored gas may quickly supplement the reformate fuel to meet a sudden increase in electricity demand by the primary load 52.

While the above disclosure has been presented with respect to the described and illustrated embodiments of the rapid start-up and operating system for a reformate fuel powered fuel cell power plant 10, it is to be understood that the disclosure is not to be limited to those alternatives and described embodiments. Accordingly, reference should be made primarily to the following claims rather than the forgoing description to determine the scope of the disclosure.

What is claimed is:

1. A rapid start-up system for a fuel cell power plant (10) utilizing a hydrogen-rich reformate fuel, the system comprising:
   a. a reformer (12) for producing the hydrogen-rich reformate fuel;
   b. at least one fuel cell (22) for generating electrical current from the reformate fuel and an oxygen containing oxidant, the fuel cell (22) including an anode catalyst (24) and a cathode catalyst (26) secured to opposed sides of an electrolyte (28), an anode flow field (30) defined in fluid communication with the anode catalyst (24) and through a fuel inlet line (18) with the reformer (12) for directing flow of the reformate fuel from the fuel inlet line (18) adjacent the anode catalyst (24), a cathode flow field (36) defined in fluid communication with the cathode catalyst (26) and through an oxidant inlet line (38) and oxidant inlet valve (40) with an oxidant source (42) for directing flow of the oxidant adjacent the cathode catalyst (26);
   c. a primary load (52) secured in electrical communication through an external circuit (54) with the fuel cell (22), the external circuit (54) including a primary load switch (56);
   d. an electrical power supply (58) for supplying direct current through a power switch (60) to the fuel cell (22); and,
   e. a hydrogen storage tank (62) selectively secured in fluid communication through a cathode exhaust valve (46) with the cathode flow field (36) and through a fuel inlet valve (20) with the fuel inlet line (18), and the hydrogen storage tank (62) secured in communication with a controller programmed for;
      i. selecting the hydrogen storage tank (62) to be in fluid communication through the cathode exhaust valve (46) with the cathode flow field (36) whenever the primary load switch (56) is open and the power switch (60) is closed;
      ii. selecting the hydrogen storage tank (62) to not be in fluid communication with the cathode flow field (36) whenever the power switch (60) is open;
      iii. selecting the hydrogen storage tank (62) to not be in fluid communication with the fuel inlet line (18) whenever the primary load switch (56) is open;
      iv. selecting the hydrogen storage tank (62) to be in fluid communication through the fuel inlet valve (20) with the fuel inlet line (18) whenever the primary load switch (56) is closed; and,
      v. the hydrogen storage tank (62) being for selectively storing hydrogen produced within the cathode flow field (36) whenever the primary load switch (56) is open and the power switch (60) is closed to electrochemically transfer hydrogen from the anode catalyst (24) to the cathode catalyst (26) for storage of the transferred hydrogen in the hydrogen storage tank (62).

2. The rapid start-up and operating system of claim 1 further comprising the hydrogen storage tank (62) being secured in fluid communication with the fuel inlet valve (20) secured to the fuel inlet line (18) for selectively directing flow of stored hydrogen within the storage tank (62) to the anode flow field (30).

3. The rapid start-up and operating system of claim 1, further comprising a compressor (47, 66) secured in fluid communication between the cathode flow field (36) and the hydrogen storage tank (62) for selectively compressing hydrogen within the hydrogen storage tank (62).

4. The rapid start-up and operating system of claim 3, wherein the compressor (66) comprises a hydrogen compressor (66) secured in fluid communication between a cathode exhaust line (44) and the hydrogen storage tank (62).

5. The rapid start-up and operating system of claim 3, wherein the compressor (47) comprises an oxidant blower (47) secured in fluid communication between an oxidant inlet line (38) downstream from the oxidant inlet valve (40) and the hydrogen storage tank (62).

6. The rapid start-up and operating system of claim 1, further comprising an anode exhaust recycle line (48), including an anode recycle valve (50), secured in fluid communication between an anode exhaust line (32) and the reformer (12) for selectively directing flow of an anode exhaust stream into the reformer (12), the anode exhaust line (32) being secured to the anode flow field (30).

7. A method of operating a reformate fuel powered fuel cell power plant (10) characterized by:
   a. supplying an oxidant adjacent a cathode catalyst (26) within a cathode flow field (36) of a fuel cell (22), and supplying the reformate fuel adjacent an anode catalyst (24) within an anode flow field (30) of the fuel cell (22) of the power plant (10) to produce electricity to power a primary load (52);
   b. disconnecting the fuel cell (22) from the primary load (52);
   c. terminating flow of the oxidant adjacent the cathode catalyst (26) while maintaining flow of the reformate fuel to the anode catalyst (24);
   d. connecting a power supply (58) to the fuel cell (22) to electrochemically transfer hydrogen from the anode catalyst (24) to the cathode catalyst (26);
   e. directing hydrogen generated at the cathode catalyst (26) to flow into a hydrogen storage tank (62) secured in fluid communication through a cathode exhaust valve (46) with the cathode flow field (36) whenever a primary load switch of the primary load (52) is open and a power switch (60) of the power supply (58) is closed;
   f. then, retaining the generated hydrogen as stored hydrogen within the hydrogen storage tank whenever the power switch (60) is open and the primary load switch (56) is open so that the stored hydrogen is not in fluid communication with the fuel cell (22) during shutdown of the fuel cell (22); and,
   g. then directing the stored hydrogen from the hydrogen storage tank (62) through a fuel inlet valve (20) to pass adjacent the anode catalyst (24) whenever the primary load switch (56) is closed during start-up of the fuel cell (22).

8. The method of operating a reformate fuel powered fuel cell power plant (10) of claim 7, comprising the further steps of terminating flow of the direct current electricity to the catalysts (24, 26), terminating flow of the reformate fuel adjacent the anode catalyst (24) of the fuel cell (22) to shut down the power plant (10), then to start up the power plant (10), directing flow of the oxidant adjacent the cathode catalyst (26), and directing flow of the stored hydrogen gas from the hydrogen storage tank (62) to the anode flow field (30), and directing electricity from the fuel cell (22) to the primary load (52).

9. The method of operating a reformate fuel powered fuel cell power plant (10) of claim 8, comprising the further steps of, after the steps of starting up the fuel cell power plant (10), directing flow of the reformate fuel adjacent the anode catalyst (24), and then selectively directing flow of the stored hydrogen from the hydrogen storage tank (62) adjacent the anode catalyst (24) to selectively increase production of electricity by the fuel cell (22).

10. The method of operating a reformate fuel powered fuel cell power plant (10) of claim 7, comprising the further steps of terminating flow of the direct current electricity from the power supply (58) to the anode and cathode catalysts (24, 26), and terminating flow of the reformate fuel adjacent the anode catalyst (24) whenever the storage tank (62) is filled with hydrogen to a predetermined level.

11. The method of operating a reformate fuel powered fuel cell power plant (10) of claim 7, comprising the further steps of terminating flow of the direct current electricity from the power supply (58) to the anode and cathode catalysts (24, 26), and terminating flow of the reformate fuel adjacent the anode catalyst (24) after a predetermined duration of directing hydrogen generated at the cathode catalyst (26) into the hydrogen storage tank (62).

\* \* \* \* \*